(12) United States Patent
Finke et al.

(10) Patent No.: US 11,661,290 B2
(45) Date of Patent: May 30, 2023

(54) STACKING SYSTEM AND METHOD

(71) Applicant: Morrison Timing Screw Company, Glenwood, IL (US)

(72) Inventors: Ryan Finke, Chicago, IL (US); Nick Lynn Wilson, Downers Grove, IL (US); Mark Burk, Highland, IN (US); Lee Kuipers, Lansing, IL (US); Timothy J. Dupin, Schererville, IN (US); Armando Garza, Highland, IN (US); Chris L J Wilson, Downers Grove, IL (US)

(73) Assignee: Morrison Timing Screw Company, Glenwood, IL (US)

( * ) Notice: Subject to any disclaimer, the term of this patent is extended or adjusted under 35 U.S.C. 154(b) by 0 days.

(21) Appl. No.: 17/453,303

(22) Filed: Nov. 2, 2021

(65) Prior Publication Data

US 2022/0135350 A1    May 5, 2022

Related U.S. Application Data

(60) Provisional application No. 63/108,751, filed on Nov. 2, 2020.

(51) Int. Cl.
| | |
|---|---|
| *B65G 57/30* | (2006.01) |
| *B65G 47/252* | (2006.01) |
| *B65G 47/44* | (2006.01) |
| *B65G 57/32* | (2006.01) |
| *B65G 57/16* | (2006.01) |

(52) U.S. Cl.
CPC ......... *B65G 57/307* (2013.01); *B65G 47/252* (2013.01); *B65G 47/44* (2013.01); *B65G 57/165* (2013.01); *B65G 57/32* (2013.01); *B65G 2201/0235* (2013.01)

(58) Field of Classification Search
CPC ...... B65G 57/307; B65G 33/04; B65G 57/32; B65G 33/06; B65G 47/252; B65G 47/44; B65G 57/165; B65G 2201/0235; B65G 7/08; B65G 47/24
See application file for complete search history.

(56) References Cited

U.S. PATENT DOCUMENTS

| | | | | |
|---|---|---|---|---|
| 2,336,606 | A | * | 12/1943 | Everett ................ B67B 3/0645 198/453 |
| 2,890,787 | A | * | 6/1959 | Carter ...................... B65C 9/06 156/DIG. 27 |

(Continued)

*Primary Examiner* — Gregory W Adams
(74) *Attorney, Agent, or Firm* — Quinn IP Law

(57) ABSTRACT

A system for forming horizontally stacked groups of containers includes an infeed screw set, an orienting screw set, and a grouping mechanism. Containers are presented to the infeed screw in a vertical orientation, and are progressed from the infeed screw set to the orienting screw set via a transitioning pocket defined by overlapping pockets of the infeed and orienting screw sets. As containers are progressed through the orienting screw the containers are rotated via a series of orienting pockets to a horizontal orientation and progressed via a series of nesting pockets to form a series of horizontally nested containers. The series is discharged to a grouping mechanism which separates a predefined number of containers from the series to form a horizontally stacked group, which is outfed from the stacking system.

19 Claims, 11 Drawing Sheets

(56) References Cited

U.S. PATENT DOCUMENTS

| | | | | |
|---|---|---|---|---|
| 3,339,702 A | * | 9/1967 | Zabroski | B65G 47/1471 198/453 |
| 3,503,486 A | * | 3/1970 | Alexander | B65B 35/26 198/462.1 |
| 3,772,756 A | * | 11/1973 | Vokes | B65G 33/06 29/809 |
| 3,827,211 A | * | 8/1974 | Zavatone | B65B 11/105 53/48.9 |
| 5,355,991 A | * | 10/1994 | Baranowski | B65G 33/06 198/412 |
| 5,472,076 A | * | 12/1995 | Sommer | B65G 47/252 198/663 |
| 6,547,057 B1 | * | 4/2003 | Carson | B65G 47/252 198/408 |
| 2013/0240329 A1 | * | 9/2013 | Brechling | B65G 33/06 198/676 |
| 2019/0329921 A1 | * | 10/2019 | Thomas | B65B 39/004 |

\* cited by examiner

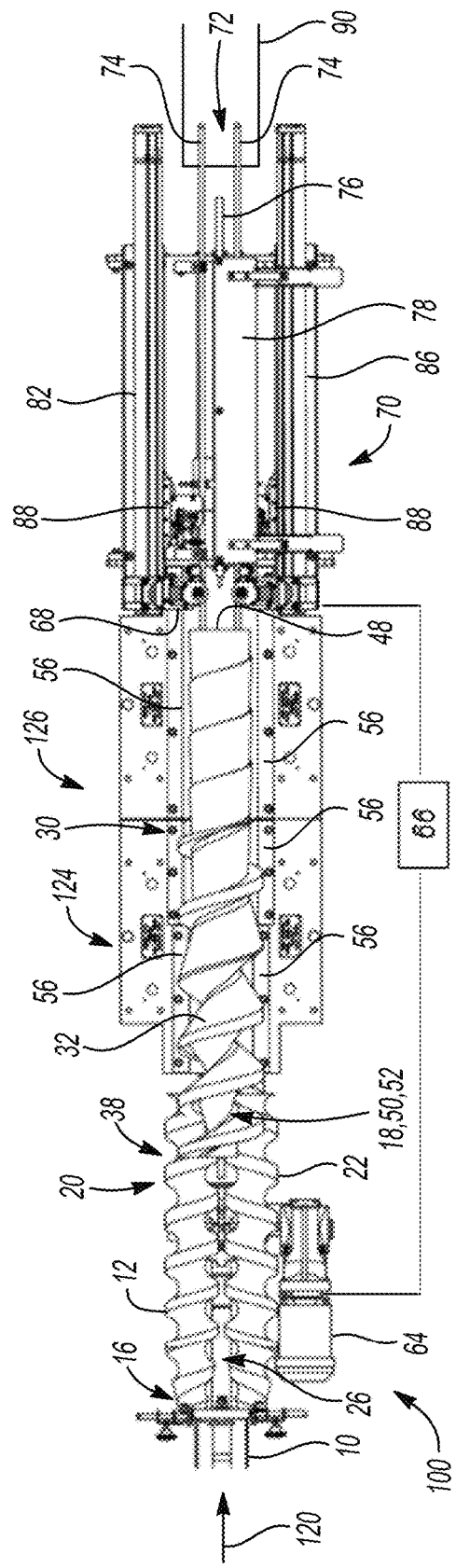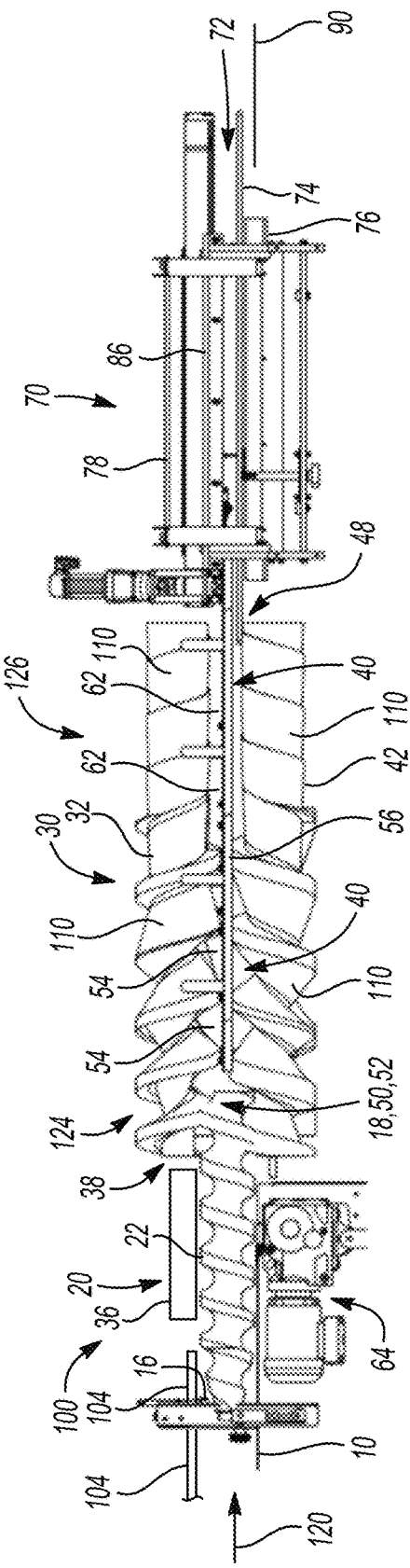

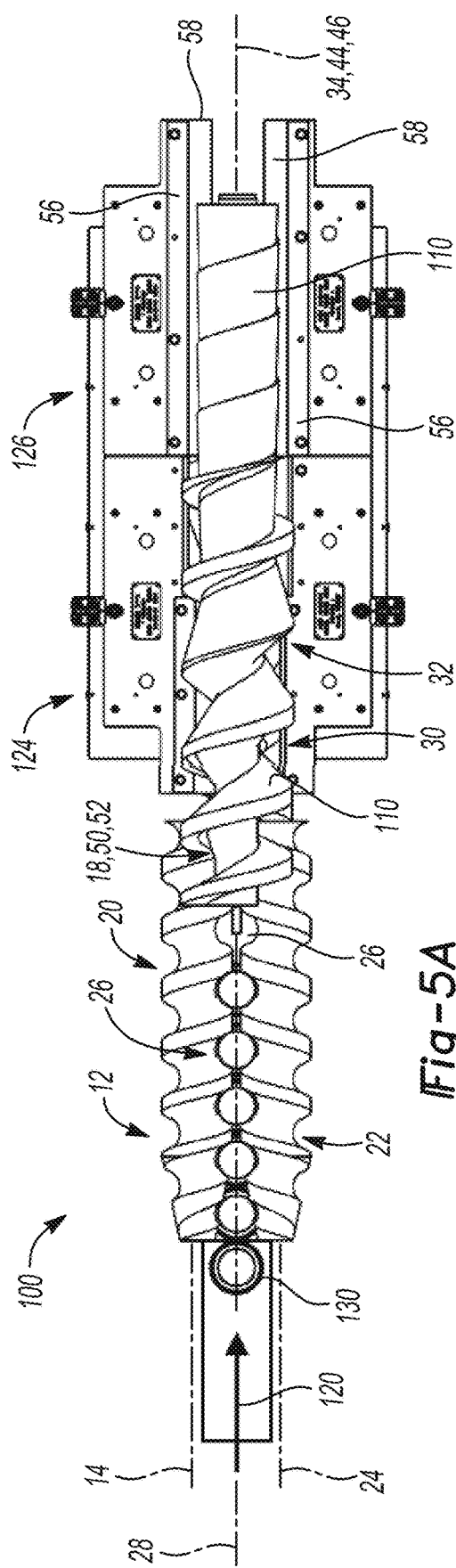
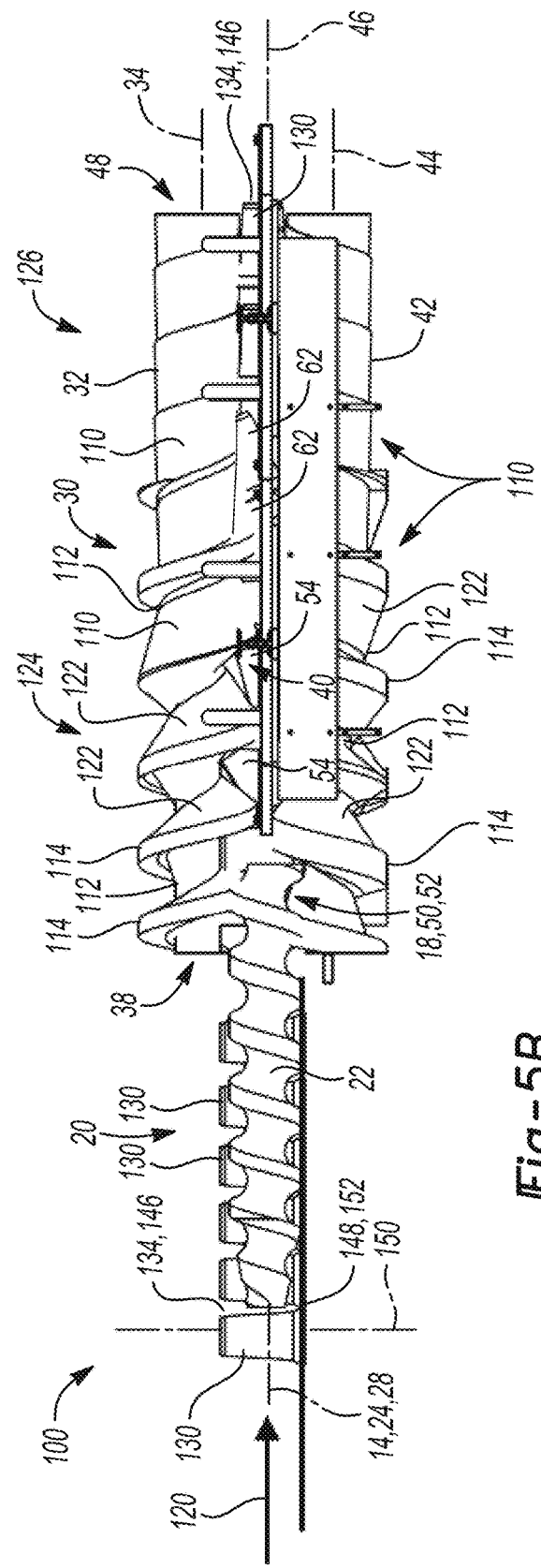

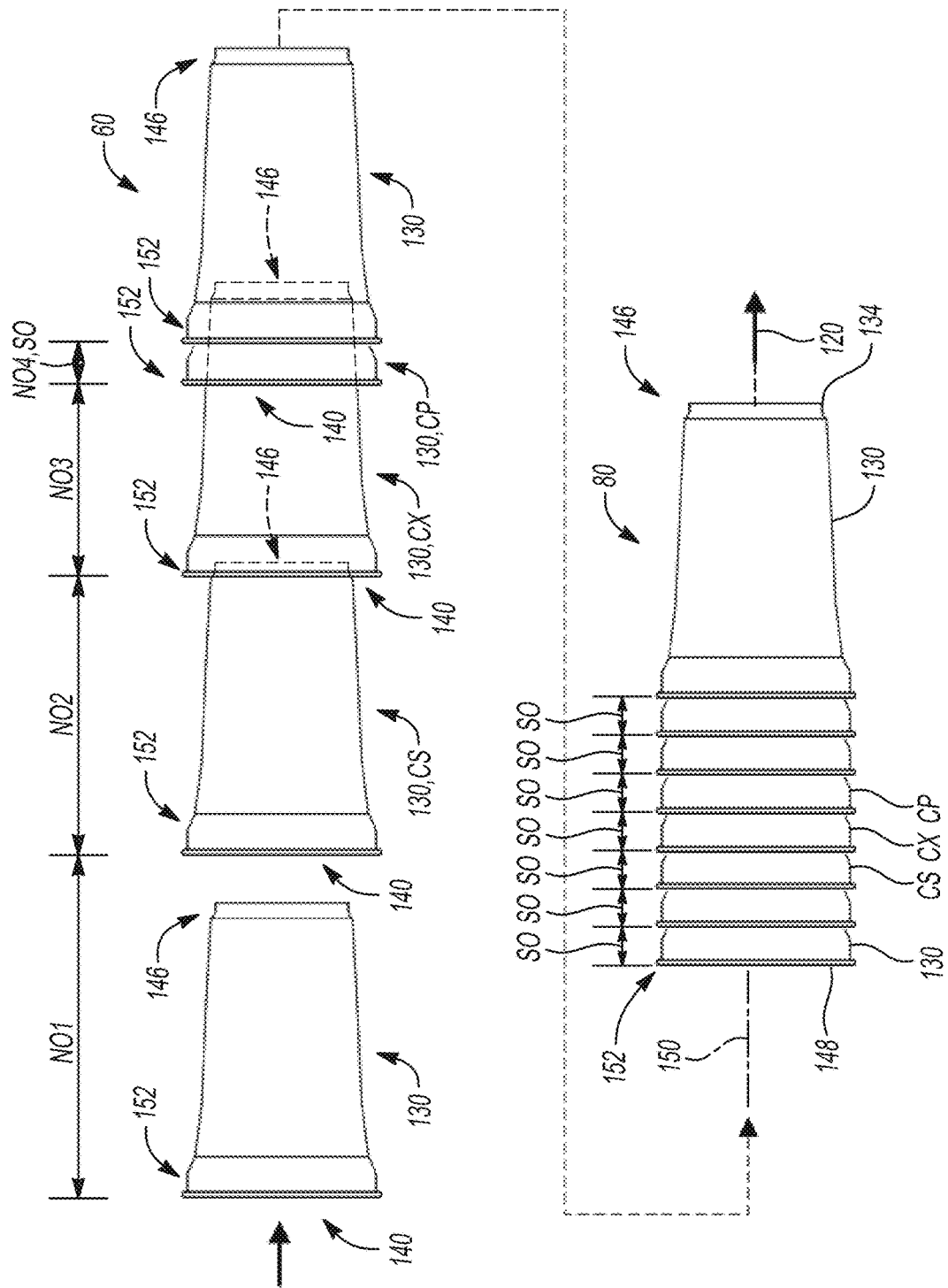

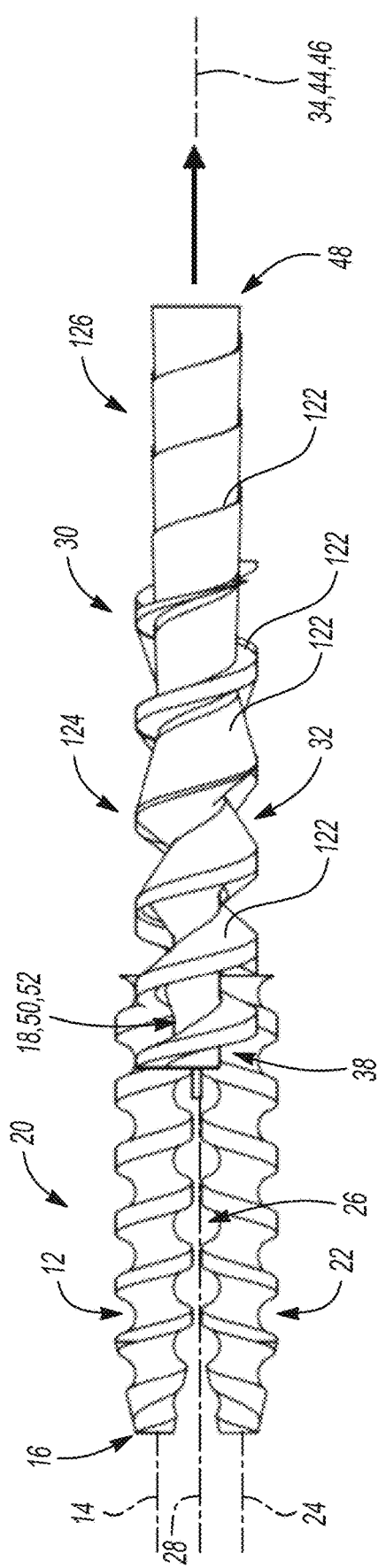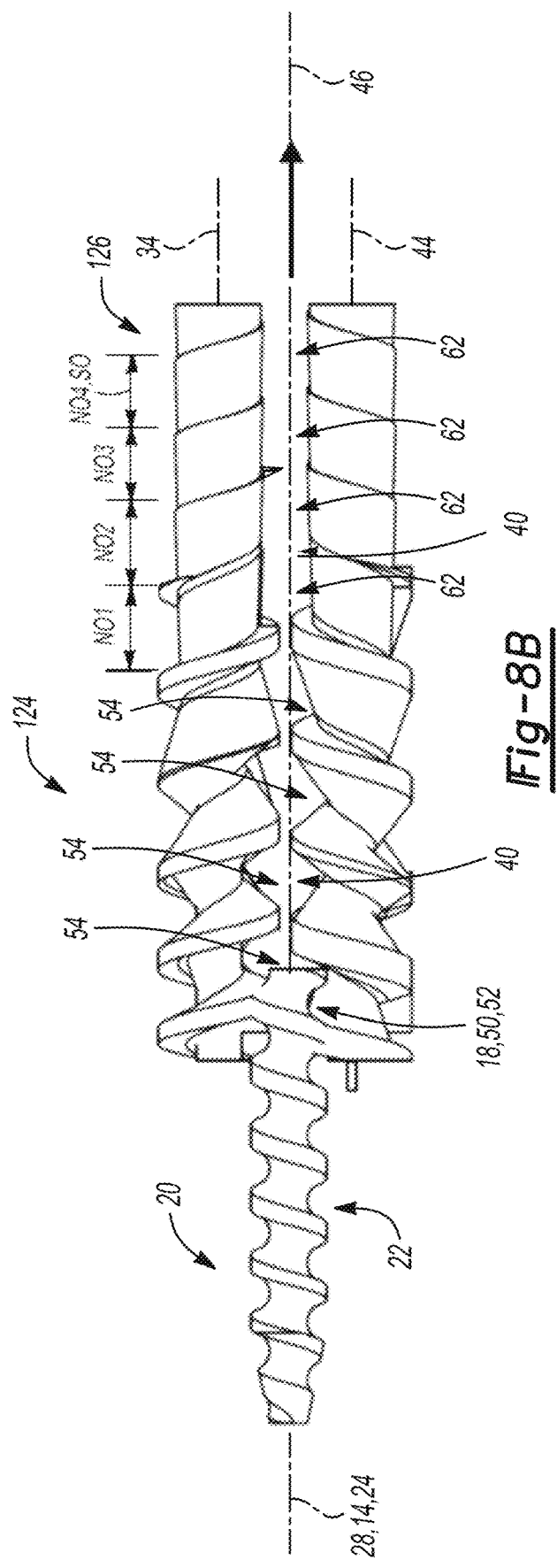
Fig-8A
Fig-8B

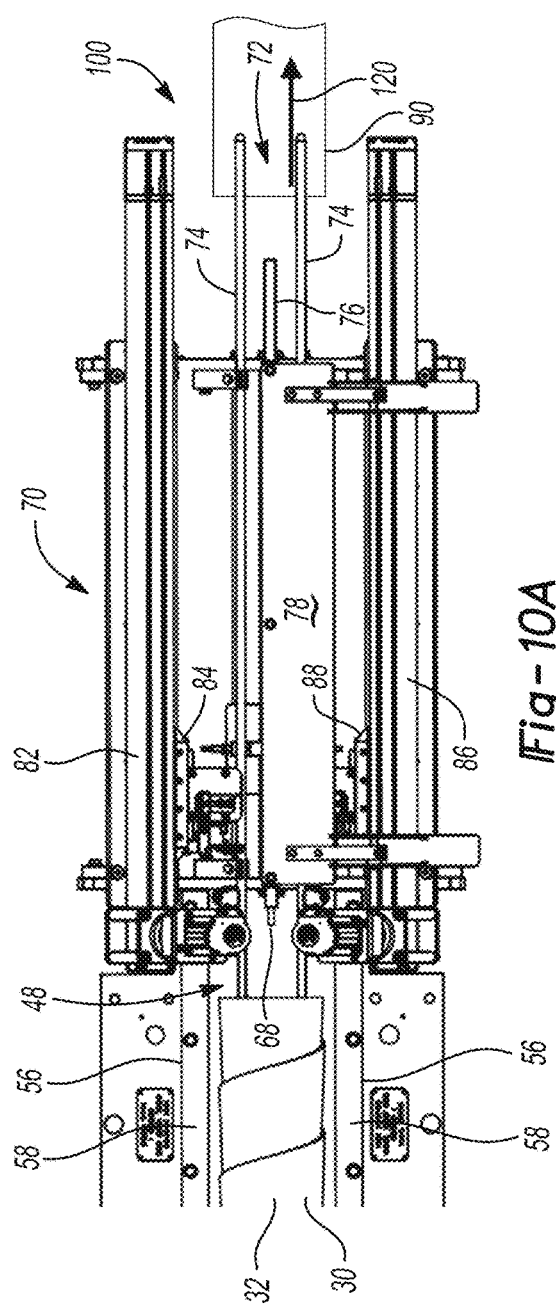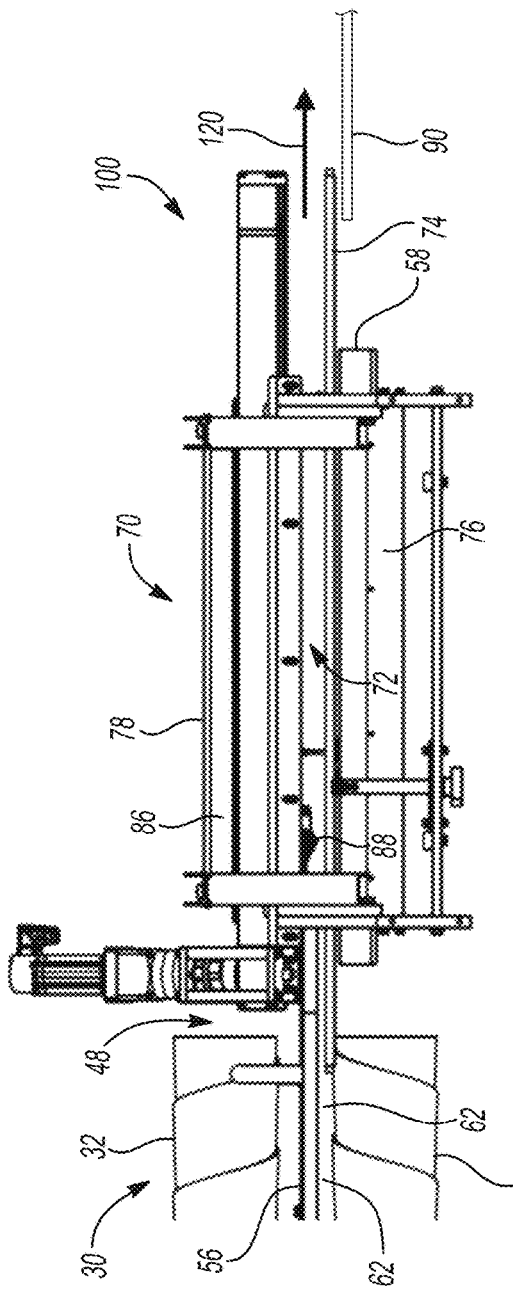

STACKING SYSTEM AND METHOD

CROSS-REFERENCE TO RELATED APPLICATION

This application claims priority to and the benefit of U.S. Provisional Application No. 63/108,751, filed Nov. 2, 2020, the contents of which are hereby incorporated by reference in their entirety.

TECHNICAL FIELD

The present disclosure relates to a stacking system for rotating and nesting objects relative to each other in a horizontally stacked orientation.

BACKGROUND

Stacking mechanisms are used in combination with conveyor mechanisms to nest objects, such as containers or cup-shaped objects relative to each other, in a vertical orientation, for subsequent operations such as packaging. To maintain the stability of the vertical stack during conveyance and/or subsequent operations such as packaging, sleeving, etc., the vertical height and/or number of containers in each vertical stack may be limited.

Vertical stacking systems orient taller and/or lightweight objects, such as containers or cups in a vertical orientation during stacking, which can be destabilizing, potentially causing a stack of objects and/or an object being stacked to tip or fall from a conveyor or fixture, which can result in a disruption of the stacking operation.

SUMMARY

A stacking system for rotating objects from a vertical orientation to a horizontal orientation, nesting the objects relative to each other in a horizontally stacked orientation, and grouping the nested objects into horizontal stacked groups is provided. The stacking system and method described herein includes an infeed screw set for receiving the containers in the vertical orientation and feeding the vertically oriented containers into an orienting screw set. The orienting screw set includes first and second screws each having a first orienting portion and a second nesting portion, where the first and second portions are integral to the screw and continuous with each other. The orienting screw set in the first orienting portion receives the container from the infeed screw set and rotates the container from the vertical orientation to a horizontal orientation as the container is progressed axially through the orienting portion of the orienting screw set. The orienting screw set in the second nesting portion axially progresses the container in the horizontal orientation through a series of nesting pockets which incrementally decrease the axial offset spacing between the respective container and the preceding container, e.g., the container axially forward of the respective container in the direction of travel through the orienting screw set, such that the end of the respective container progresses axially into the open end of the preceding container, to nest therein. A succeeding container is nested into the open end of the respective container in the same manner, such that as additional containers are reoriented and nested to each other as they are progressed through the orienting screw set, and a series of horizontally nested containers is discharged from a discharge end of the orienting screw set to a grouping mechanism.

In an example method, the containers positioned on the infeed conveyor are each positioned in an inverted vertical orientation, such that a base of the container is topmost and distal from the conveyor, and a longitudinal axis of the container is substantially perpendicular to the conveyor. In an illustrative example, the containers have a frustoconical shape defined by sidewall tapered between a container base at a closed end of the container and a container opening at an open end of the container, where the opening is defined by a lip edge of the container, where the container base has a smaller diameter than the container opening. In the inverted vertical orientation, the container lip edge is in contact with the conveyor such that the open end of the container is proximal to the conveyor, and the base of the container is in the topmost position relative to the conveyor such that the closed end is distal from the conveyor. When rotated to a horizontal orientation, the longitudinal axis of the container is substantially parallel to the horizontal plane, such that the longitudinal axis of the nested series of containers is substantially parallel to the horizontal plane.

In an illustrative example, the grouping mechanism includes a discharge chute for receiving the nested series of containers, which in an illustrative example includes parallel chute rails each in tangential contact with the lip edges of the nested containers, and a central support rail including a passive member for supporting the nested containers in the chute. The grouping mechanism further includes at least one linear actuator including a slide rail moveable along an axial length of the discharge chute between a first position and a second position. The slide rail includes a pusher and a puller, where the puller is operable to separate a predetermined number of containers from the nested series to form a stacked group by pulling the predetermined number of containers from the first position to a second position in the chute. The pusher is operable to push a preceding stacked group of containers from the second position in the chute to a outfeed end of the chute, where the stacked group is received onto an outfeed conveyor for transport to a subsequent operation, such as a packaging operation. The slide rail including the puller and pusher is configured such that the puller pulls a respective stacked group from the nested series of containers while contemporaneously pushing a preceding stacked group to the outfeed end of the chute. In an illustrative example, the grouping mechanism includes first and second linear actuators, disposed on opposing sides of the discharge chute, which are configured to be actuated in turn, e.g., in an alternating pattern, such that as one slide rail is in motion moving stacked groups along the discharge chute and/or returning to the first position, the other slide rail is available to pull away the next stacked group formed as the series of containers are continuously discharged from the orienting screw set, and such that there is no delay waiting for the slide rail to return to first position.

The system and method described herein for horizontal nesting of containers and forming horizontal stacked groups is characterized by numerous advantages as compared with vertical stacking methods and systems. For example, by maintaining continuous supportive contact of the container throughout the infeed, rotation, nesting and grouping processes, instability of the container during movement is minimized and/or substantially eliminated. Further, horizontal stacks exhibit greater stability for transfer via conveyor, for example, relative to vertical stacks which may bend relative to a vertical axis of the stacked column. By comparison, horizontal stacks are readily transported via conveyors, chutes, etc. to subsequent operations such as sleeving, bulk packing, etc. The continuous flow aspect of the process disclosed herein, where contact with the container by stabilizing screw sets through infeed, translation of the container from a vertical to a horizontal orientation, and nesting of the container between preceding and succeeding containers enables high speed movement of the containers through the orienting, nesting and grouping segments, such that relatively high throughputs in the range of about 400 to 800 containers per minute (cpm) have been realized. Further, because of the continuous flow aspect of the process, the throughput rate can be varied by modifying the rotation speed of the screw sets, such that the throughput of the line can be continuously varied in a range of about 150 cpm to about 400 cpm in one example, and in a range of about 150 cpm to about 800 cpm in another example.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3A is a schematic illustration of a top view of the stacking system of FIG. 1, showing an infeed screw set, an orienting screw set, and a grouping mechanism including a discharge chute;

FIG. 3B is a schematic illustration of a side view of the stacking system of FIGS. 1 and 3A;

FIG. 5A is a schematic illustration of a top view of the infeed screw set and orienting screw set of FIG. 4, showing a series of containers being progressed through the infeed and orienting screw sets;

FIG. 5B is a schematic illustration of a side view of the infeed and orienting screw sets of FIGS. 4 and 5A;

FIG. 7 is a schematic illustration showing the nesting offset between containers as the containers are progressed into a nested series by the orienting screw set, and further showing an example stacked group of containers characterized by a stack offset between the containers;

FIG. 8A is a schematic illustration of a top view of the infeed screw set and orienting screw set of FIG. 5A;

FIG. 8B is a schematic illustration of a side view of the infeed and orienting screw sets of FIG. 5B, showing orienting and nesting pockets defined by the orienting screw set;

FIG. 10A is a schematic illustration of a top view of the grouping mechanism of FIG. 1 including a partial top view of the orienting screw set;

FIG. 10B is a schematic illustration of a side view of the grouping mechanism of FIG. 1 including a partial side view of the orienting screw set;

DETAILED DESCRIPTION

Figure 1:
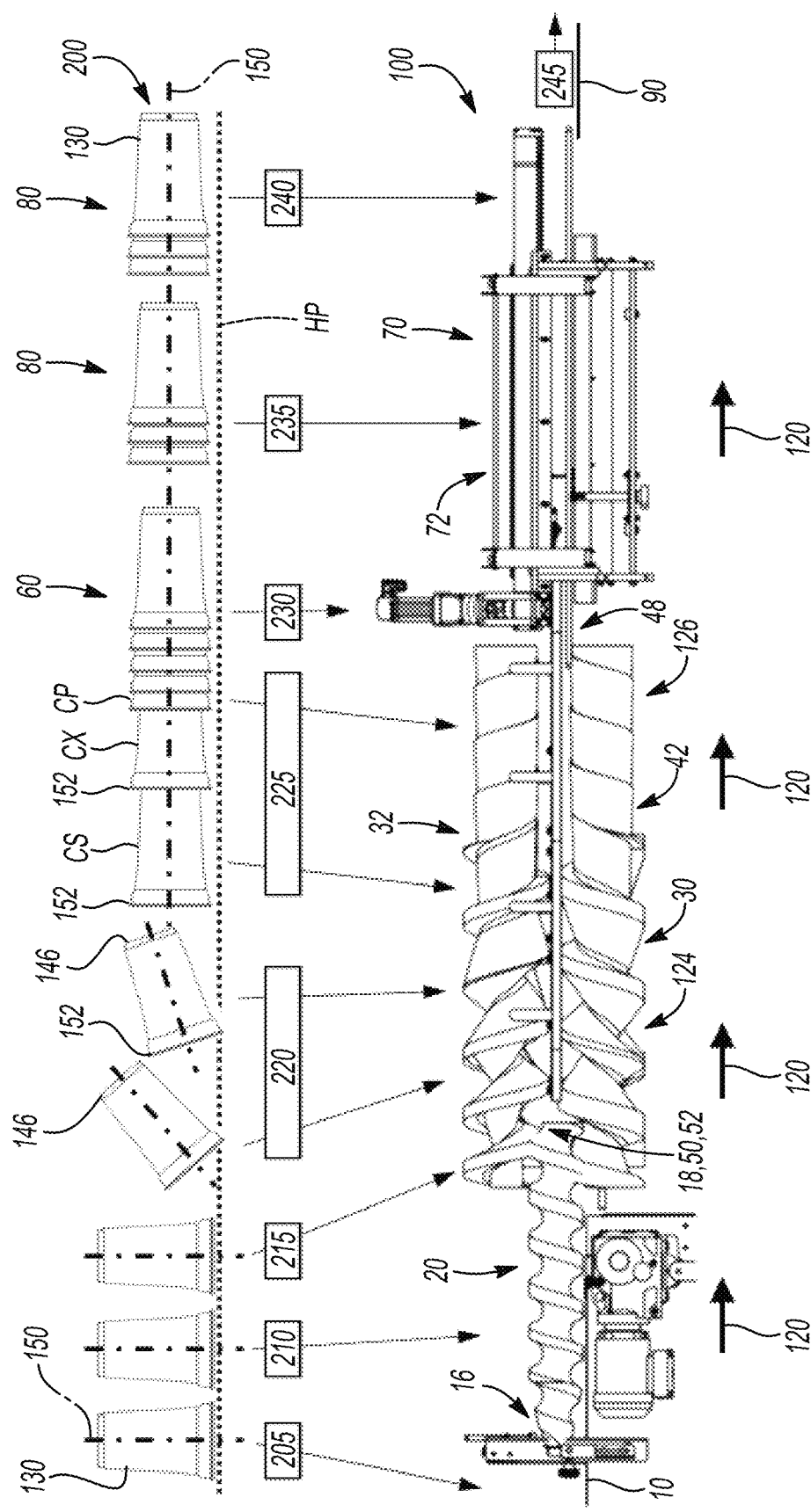
FIG. 1 is a schematic illustration of a side view of a stacking system for reorienting containers received in a vertical orientation to a horizontal orientation, nesting the containers relative to each other in the horizontal orientation to provide series of horizontally nested containers and selectively separating a predetermined number of containers from the nested series to form a stacked group of containers, the figure further including a schematic illustration of a container position at each step of the process as described by the method shown in FIG. 2.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Referring to the drawings wherein like reference numbers represent like components throughout the several figures, the elements shown in FIGS. 1-11D are not necessarily to scale or proportion. Accordingly, the particular dimensions and applications provided in the drawings presented herein are not to be considered limiting. FIGS. 3A and 3B can be collectively referred to herein as FIG. 3. FIGS. 5A and 5B can be collectively referred to herein as FIG. 5. FIGS. 8A and 8B can be collectively referred to herein as FIG. 8. FIGS. 10A and 10B can be collectively referred to herein as FIG. 10. FIGS. 11A, 11B, 11C and 11D can be collectively referred to herein as FIG. 11.

Referring to FIGS. 1-11B, a stacking system is indicated generally at 100, and a method for stacking containers into horizontal stacked groups 80 is indicated generally at 200. Referring to the figures, the stacking system 100 includes an infeed screw set indicated generally at 20 configured to receive containers 130 in a vertical inverted orientation from an infeed conveyor 10, an orienting screw set 30 including an orienting portion 124 operable to translate the containers 130 from the vertical inverted orientation to a horizontal orientation and further including a nesting portion 126 operable to axially progress the containers 130 in the horizontal orientation such that each container 130 nests into a preceding container 130 to form a nested series 60 of containers discharged continuously from the orienting screw set 30 by rotation of the first and second orienting screws 32, 42. The stacking system 100 includes a grouping mechanism 70 arranged to receive the nested series 60 into a discharge chute 72, where the grouping mechanism 70 is operable to separate the nested series 60 into stacked groups 80, each stacked group 80 including a predetermined number of horizontally oriented and nested containers 130. In a non-limiting example, the stacked groups 80 are fed out from the stacking system 100 to an outfeed conveyor for conveyance, for example, to a subsequent operation such as a sleeving or other packaging operation.

The stacking system 100 includes a drive system 64 including, for example, at least one motor and linkages and/or synchro bars, for driving the infeed screw set 20, the orienting screw set 30, the infeed conveyor 10, and/or the outfeed conveyor 90. The stacking system 100 includes a controller 66 in communication with the drive system 64 and the grouping mechanism 70 where the controller 66 is operable to coordinate and/or synchronize actuation, operation and/or movement of the various components of the stacking system 100 such that during operation, a continuous and uninterrupted flow of incoming individual vertically oriented inverted containers 130 can progress from the infeed conveyor 10 through the stacking system 100 and be output from the outfeed end 102 of the grouping mechanism 70 in a horizontal orientation, nested relative to each other in a horizontal stacked group 80 including a predetermined number of the containers 130. The stacking system 100 can further include one or more sensors 68 in communication with and/or actuable to sense a condition of one or more of the controller 66, drive system 64, infeed conveyor 10, infeed screw set 20, orienting screw set 30, grouping mechanism 70, outfeed conveyor 90, and/or elements and components thereof. The controller 66 includes programming, algorithms and/or instructions for analyzing sensor signals received from the sensors 68 and/or outputting control signals in response to the sensor signals. The controller 66 is operable to varying the operating speeds of the various components 10, 20, 30, 70, 90 to synchronize and/or vary the rate of throughput of the containers 130 through the stacking system 100, to vary the predetermined number of containers 130 in the stacked group 80 pulled from the nested series 60 by the grouping mechanism 70, etc. In one example, during continuous flow operation, the stacking system 100 is operable to achieve a throughput in the range of about 150 to 400 containers per minute (CPM). This example is non-limiting, such that the stacking system 100 is operable at throughput rates in excess of 400 containers per minute (CPM). In one example, the stacking system 100 is operable to form stacked groups 80 at throughput rates of at least 800 CPM. The operating throughput rate, including a maximum throughput rate, is at least partially dependent upon the configuration of the container 130, including the shape, dimensions, rigidity, surface finish and/or other material characteristics of the container 130.

In a non-limiting and illustrative example, the stacking system 100 can be operated at 400 CPM to output stacked groups 80 each including ten (10) containers, such that the stacking system 100 in the present example outputs a quantity of forty (40) stacked groups 80 per minute from the grouping mechanism 70 to an outfeed conveyor 90. It would be understood, that for downstream operations requiring an infeed rate of stacked groups in excess of forty (in the present example), multiple stacking systems 100 can be used in parallel and coordinated feeding of the stacked groups 80 from the multiple stacking systems 100 to the downstream operations can be used. Advantageously, the horizontal stacked groups 80 remain nested and stable during conveyance of the horizontal stacked groups 80 by chutes, conveyors, etc., such that consolidation of stacked groups 80 from multiple stacking systems 100, for example, to a singular feed mechanism (not shown) is not inhibited by stack instability, as may occur with a vertically stacked group, and such that the horizontally stacked groups 80 provide an advantage during consolidation of output from multiple stacking systems 100.

Figure 2:
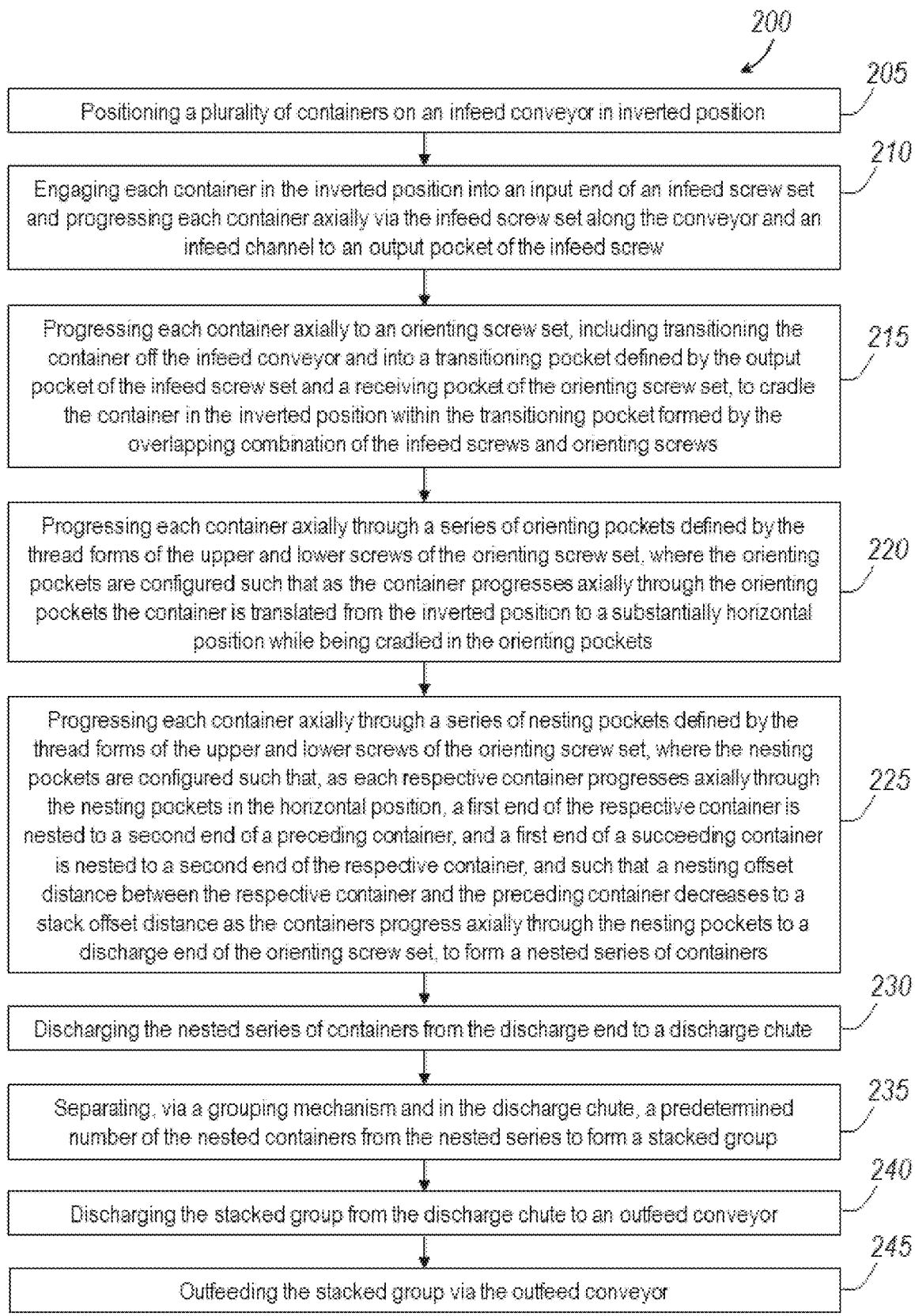
FIG. 2 is a flowchart illustration of a method for forming horizontal stacked groups of containers using the system of FIG. 1.
Figure 4:
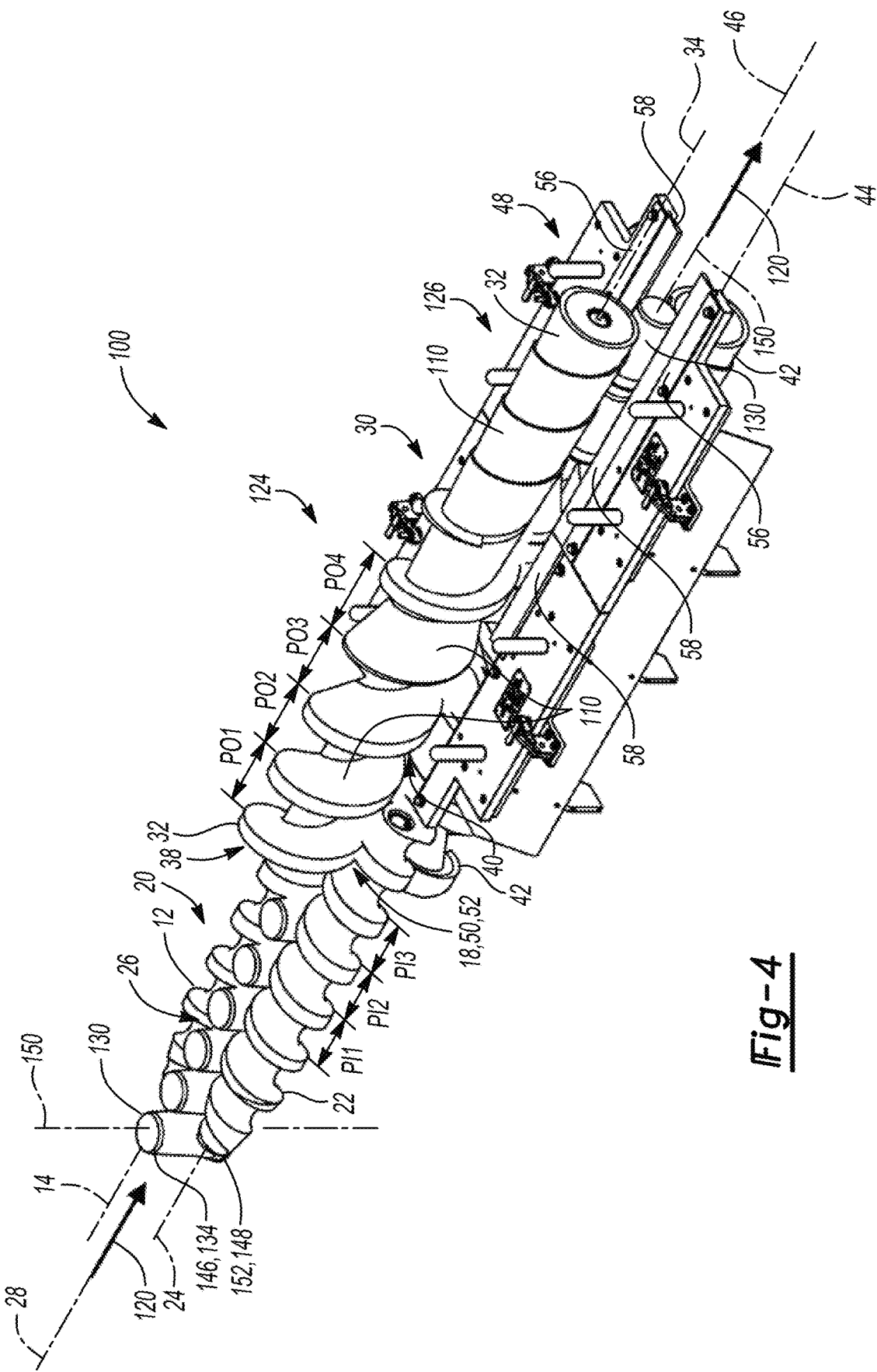
FIG. 4 is a schematic illustration of a perspective view of the infeed screw set and orienting screw set of FIGS. 3A and 3B, showing a series of containers being progressed through the infeed and orienting screw sets.

FIG. 1 illustrates the movement of containers 130 through the stacking system 100, relative to a horizontal plane HP and according to an example method 200 shown in FIG. 2 performed by the stacking system 100, including translation of the containers 130 from an inverted vertical orientation to a horizontal orientation by an orienting portion 124 of the orienting screw set 30, nesting of the containers 130 by a nesting portion 126 of the orienting screw set 30 to form a nested series 60 of the horizontal containers 130, and grouping of the horizontal containers 130 from the nested series 60, by the grouping mechanism 70, into a plurality of stacked groups 80 for discharge from the system 100, for example, to an outfeed conveyor 90.

Figure 6:
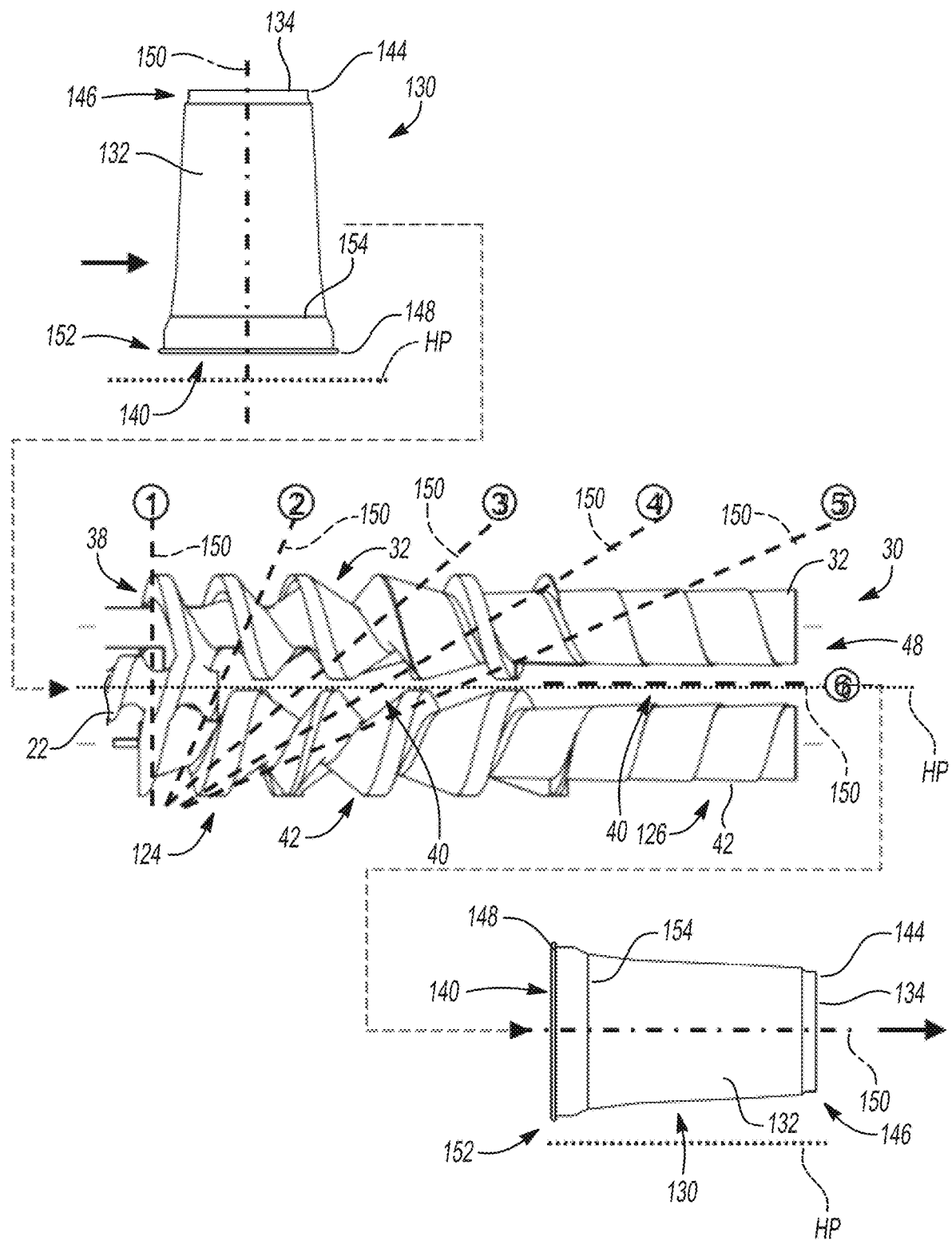
FIG. 6 is a schematic illustration showing a container in an inverted vertical orientation progressing through a sequence of decreasing tilt angles to a horizontal orientation as the container is progressed through the orienting screw set of the stacking system of FIG. 1.
Figure 9:
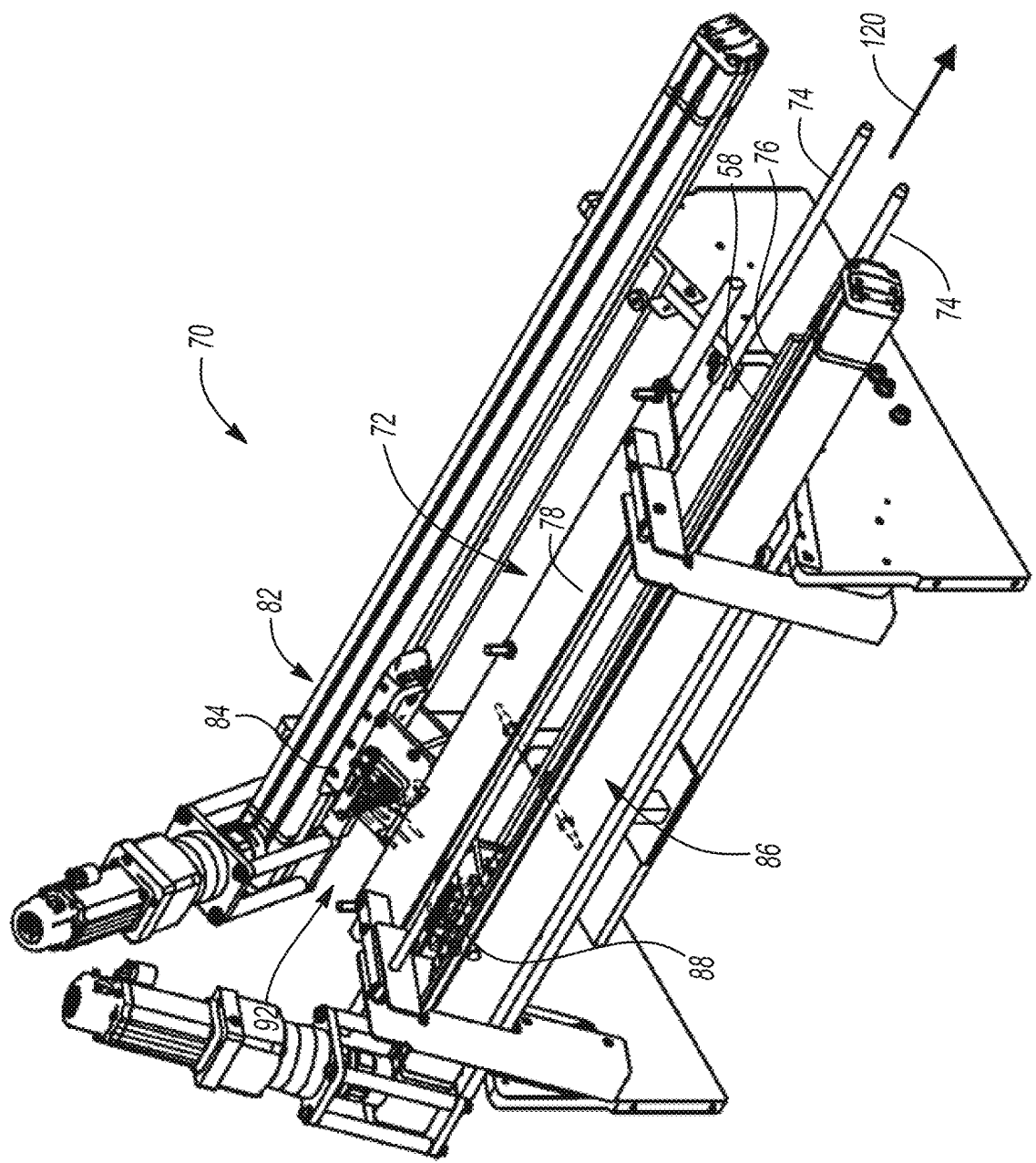
FIG. 9 is a schematic illustration of a perspective view of the grouping mechanism of the stacking system of FIG. 1.

Referring to FIGS. 1 and 2, the method 200, at 205, includes positioning a plurality of containers 130 on the infeed conveyor 10 in an inverted vertical orientation such that a longitudinal axis 150 of the container 130 is substantially perpendicular to a horizontal plane HP defined by the conveyor 10, and such that a open end 152 of the container is proximal to the conveyor 10 and a closed end 146 of the container is distal from the conveyor 10 and topmost when the container 130 is in the inverted vertical orientation. In a non-limiting example, the container 130 may be configured as a beverage container such as a cup, as shown in detail in FIG. 6, including a base 134 defined by a base edge 144, a lip or top edge 148 defining an opening 140 and a side wall 132 extending therebetween. In the example shown, the container 130 has a frustoconical shape defined by a base diameter which is smaller than the diameter of the opening 140 defined by the lip edge 148, such that the side wall 132 is tapered, for example, to facilitate nesting of the containers 130 within each other as shown in FIG. 7 to form a stacked group 80, where in the example shown, each container CX in the stacked group 80 is offset from a preceding container CP and a succeeding container CS by a stack offset distance SO. The container 130 may include one or more features, such as a shoulder 154 or base corner 144 configured to define the stack offset distance SO. As shown in FIG. 6, the container 130 includes a base end 146 also referred to herein as a closed end 146, and an open end 152, and defines a longitudinal container axis 150 as shown in FIG. 6. It would be understood that in use as a beverage cup, the container 130 is oriented in an upright vertical orientation relative to a horizontal plane such as a table surface, such that the container axis 150 is substantially perpendicular to the horizontal plane and the lip edge 148 is topmost relative to the horizontal plane and the base 134, so as to contain a beverage in the container 130 without spillage when positioned on the table surface in the upright vertical orientation. In the illustrative example shown in the figures, the container 130 is positioned on the infeed conveyor 10 in an inverted vertical orientation for progression into the infeed screw set 10, where in the inverted vertical orientation the base 134 of the container 130 is topmost and distal from the conveyor 10, and the longitudinal axis 150 of the container 130 is substantially perpendicular to the substantially horizontal surface of the conveyor 10. In the inverted vertical orientation the container lip edge 148 is in contact with the conveyor 10 such that the open end 152 of the container 130 is proximal to the conveyor 10, and the base 134 of the container 130 is in the topmost position relative to the conveyor 10, such that the closed end 146 is distal from the conveyor 10. When rotated to a horizontal orientation, the longitudinal axis 150 of the container 130 is substantially parallel to the horizontal plane HP, such that the longitudinal axis of the nested series 60 of containers 130 is substantially parallel to the horizontal plane HP.

At step 210 of the method 200, the containers 130 in the vertical orientation are progressed by the infeed conveyor 10 into an input end 16 of the infeed screw set 20 and each container 130 is progressed axially by rotation of the infeed screw set 20 along an infeed channel 26 defined by opposing first and second infeed screws 12 and 22 to an output pocket 18 of the infeed screw set 20. As shown in the figures, the first infeed screw 22 defines a first infeed screw axis 14, the second infeed screw defines a second infeed screw axis 24, and the infeed channel defines an infeed channel axis 28. In the example shown, he first infeed screw 12 and the second infeed screw 22 are mirror images of each other relative to the longitudinal infeed channel axis 28. The infeed screw set 20 is arranged such that the first infeed screw axis 14, the second infeed screw axis 24 and the infeed channel axis 18 are coplanar in a substantially horizontal plane HP, such that when the container 130 is in the vertical orientation as it progressed through the infeed channel 26 and when positioned in the output pocket 18, the container axis 150 is substantially perpendicular, e.g., at a tilt angle of about 90 degrees relative to the horizontal plane HP, as shown in the figures including FIG. 6.

As shown in FIG. 3B, a conveyor top rail 104 can be positioned above the infeed conveyor 10 to stabilize the vertically oriented containers 130 during movement along the infeed conveyor 10. As shown in FIG. 3B, an infeed top rail 36 can be positioned above the infeed screw set 20 to stabilize the vertically oriented containers 130 during movement along the infeed channel 26.

Referring again to the figures, the orienting screw set 30 includes a first orienting screw 32 and a second orienting screw 42 which are arranged to define an orienting channel 40 therebetween. A first orienting screw axis 34 is defined by the first orienting screw 32, also referred to herein respectively as an upper orienting screw axis 34 and an upper orienting screw 32, where as shown in the figures, the upper orienting screw 32 is positioned above the horizontal plane HP defined by axes 14, 24, 28. A second orienting screw axis 44 is defined by the second orienting screw 42, also referred to herein respectively as a lower orienting screw axis 44 and a lower orienting screw 32, where as shown in the figures, the lower orienting screw 42 is positioned below the horizontal plane HP. The orienting channel 40 defines a longitudinal axis 46. The orienting screw set 30 is arranged such that the upper orienting screw axis 34, the lower orienting screw axis 44 and the orienting channel axis 46 are coplanar in a substantially vertical plane VP, such that when the container 130 is in the vertical orientation as it is positioned in a transitioning pocket 50 defined by the overlapping receiving pocket 52 of the orienting channel 40 and the output pocket 18 of the infeed channel 20, the container axis 150 is substantially parallel to and/or lies within the vertical plane VP, and such that when the container 130 is in the horizontal orientation in the nesting pockets 62 of the orienting channel 40, e.g., at a tilt angle of about 0 degrees relative to the horizontal plane HP, as shown in the figures including FIG. 6, the container axis 150 is substantially parallel to each of the horizontal and vertical planes HP, VP, and substantially parallel to the orienting channel access 46.

As shown in the figures, the infeed screw set 20 and the orienting screw set 30 are arranged such that the horizontal plane HP is perpendicular to the vertical plane VP. Referring again to the figures, including FIGS. 3, 4, 5, and 8, the infeed conveyor 10, infeed screw set 20 and orienting screw set 30 are arranged such that the infeed conveyor 10 does not extend the full axial length of the infeed screw set 20, terminating prior to the output pocket 18 defined by the infeed screw set 20. The portion of the infeed screw set 20 defining the output pocket 18 is overlapped with the portion of the receiving end 38 of the orienting screw set 30 defining the receiving pocket 52, to form a transitioning pocket 50 defined by the overlapping output and receiving pockets 18, 52. As illustrated by the figures, a container 130 transitioning from the infeed channel 26 to the orienting channel 40 is cradled in the transitioning pocket 50 in a vertical orientation, surrounded at the closed end 146, the open end 152, and opposing sides of the side wall 132 respectively by the upper orienting screw 32, the lower orienting screw 42, and the first and second infeed screws 12, 22, providing multidirectional support to the container 130 as it is transitioned into the orienting screw set 30 and stabilizing the position of the container 130 as translation of the container 130 from the vertical orientation to the horizontal orientation is initiated by the series of orienting pockets 54.

At step 215 of the stacking method 200, the container 130 is progressed axially from the infeed screw set 20 to the orienting screw set 30 by transitioning the container 130 from the infeed conveyor 10 and into the transitioning pocket 50 previously described herein.

At step 220 of the stacking method 200, each container 130 is progressed axially through a series of orienting pockets 54 defined by the screw thread form 110 of the upper and lower screws 32, 42 of an orienting portion 124 defined by the orienting screw set 30, where the orienting pockets 54 are configured such that as the container 130 progresses axially through the orienting pockets 54, the container 130 is translated from the vertical orientation (shown at encircled tilt angle [1] in FIG. 6 and corresponding to a vertical tilt angle of 90 degrees relative to the horizontal plane HP) through progressively decreasing tilt angles (shown by encircled tilt angles [2], [3], [4], [5] in FIG. 6) to a substantially horizontal orientation (shown at encircled [6] and corresponding to a horizontal tilt angle of 0 degrees relative to the horizontal plane HP) while being cradled in the orienting pockets 54. As illustrated schematically in FIGS. 5, 6 and 8, each of the screw threads defining the series of orienting pockets 54 differs from another screw thread in at least one of a width of the land 114, a contour and/or flank angle of the thread flank 122, a shape and/or root diameter of the thread root 112, and/or by pitch variance from thread to thread, such that each of upper and lower orienting screw threads 32, 42 each have a different screw thread form 110, and such that the upper and lower orienting screw threads 32, 42 are not mirror images of each other relative to the orienting channel axis 46. As shown in the figures and as defined by the differing screw thread forms 110 of the upper and lower orienting screws 32, 42, the shape of each of the orienting pockets 54 defined by the orienting screw set 30 is asymmetrical relative to the orienting channel axis 46.

In the example shown in the figures, the stacking system 100 includes orienting guide rails 56 including passive segments 58, such as brushes or other material providing a flexible interface for incidental contact with the containers 130, positioned at each side of the orienting channel 40 and along its axial length to provide a supportive pressure to the container 130 while cradled in the orienting pockets 54, in the event of incidental contact between the container 130 and the passive segment 58 as it rotates and is translated from the vertical orientation to the horizontal orientation during progression through the series of orienting pockets 54, and to minimize lateral movement of the container 130 relative to the orienting pockets 54 and/or the orienting channel axis 46. The guide rails 56 including passive segments 58 provide a supportive pressure against the container 130 from each side of the orienting channel 40 in the nesting portion 126 of the orienting screw set 30, to minimize axial skewing of the container 130 as the container 130 (CX) is nested between a preceding container 130 (CP) and a succeeding container 130 (CS) as the container 130 (CX) during progression through the series of nesting pockets 62, as described for step 225.

At step 225 of the method 200, and as illustrated by FIGS. 4-7, each container 130 is progressed axially through a series of nesting pockets 62 defined by the thread forms 110 of the upper and lower orienting screws 32, 42 of the orienting screw set 30, where the nesting pockets 62 are configured such that, as each respective container 130 progresses axially through the nesting pockets 62 in the horizontal orientation, a first end 146 of the respective container 130 (CX) is nested to a second end 152 of a preceding container 130 (CP), and a first end 146 of a succeeding container 130 (CS) is nested to a second end 152 of the respective container 130 (CX), and such that a nesting offset distance NO between the respective container 130 (CX) and the preceding container 130 (CP) decreases to a stack offset distance SO as the containers 130 (CS, CX, CP) progress axially through the nesting pockets 62 to a discharge end 48 of the orienting screw set 30, to form a nested series 60 of containers 130. In the example shown in FIG. 7, the nesting offset distance NO1>NO2>NO3>NO4, where at NO4, the container 130 (CP) is nested at an offset distance which is substantially the same as the stacking offset distance SO, e.g., NO4=SO, where the stacking offset distance SO may be established, for example, by physical features of the containers 130 such as the degree of taper of the side wall 132, the shape and/or size of a shoulder 154, etc.

At 230, the method 200 continues with discharging the nested series 60 of containers 130 from the discharge end 48 to the discharge chute 72 of the grouping mechanism 70. In the example shown, the discharge chute 72 includes a pair of discharge rods 74, which in the illustrated example are configured as metal rods made, for example, of stainless steel. The discharge rods 74 are arranged in parallel to each other and the longitudinal axis of the orienting channel axis 46 such that as the nesting series 60 of containers 130 is progressed from the orienting screws 30 to the grouping mechanism 70, the lip edge 148 of the containers 130 are in tangential contact with the discharge rods 74. A support rail 76, which can include a passive segment 58, such as a brush as described previously for orienting guides 56, can be positioned relative to the discharge chute 72, as shown in FIGS. 10A and 10B, to provide a supportive pressure against the nested series 60 and/or the stacked groups 80 during movement of these along the discharge chute 72. The discharge rods 74 can have a polished finish such that contact between the rods 74 is disposed between the discharge rods 74 and extends the axial length of the discharge rods 74 to providing supportive back pressure to the nested series 60 and to stacked groups 80 of containers 130 separated therefrom by the grouping mechanism 70. The discharge chute 72 can further include a grouping top rail 78 to stabilize the nested series 60 and/or the stacked groups 80 during movement of these along the discharge chute 72. The grouping top rail 78 may be removably attached or hingedly attached such that the grouping top rail 78 can be removed or repositioned to access the discharge chute 72, for example, to perform a maintenance operation.

At step 235, referring to FIG. 11, the stacking method 200 includes separating, via the grouping mechanism 70 and in the discharge chute 72, a predetermined number of the nested containers 130 from the nested series 60 to form a stacked group 80 of containers 130. As shown in the figures, the grouping mechanism 70 includes at least one linear actuator 82, 86 operable to pull away a stacked group 80 of containers 130 from the nested series 60, and to move the stacked group 80 axially along the length of the discharge chute 72 for discharge at an outfeed end 102 of the grouping mechanism 70. In the example illustrated in the figures, the grouping mechanism 70 includes first and second linear actuators 82, 86, positioned on opposing sides of the discharge chute 72, such that the first and second linear actuators 82, 86 can be alternatively actuated (cycled) as shown in FIGS. 11A-11D to allow the infeed and orienting screw sets 20, 30 to run continuously and output a continuous nested series 60 of containers 130 while the first and second linear actuators 82, 86 cycle to pull stacked groups 80 away from the nested series 60, as shown in the illustrative example in the Figures and described in further detail herein. The cycling of the first and second linear actuators 82, 86 is synchronized with the output rate of the containers 130 from the orienting screw set 30, for example, by the controller 66, such that as one of the linear actuators 82, 86 pulls a stacked group 80 (SX) away from the nested series 60 at a first axial position 108 in the discharge chute 72 and containers 130 in the nested series 60 continue to be discharged from the orienting screw 30, the other of the linear actuators 82, 86 is moved to the first position 108 and available to pull a succeeding stacked group 60 (SS) away from the nested series 60 when the predetermined number of nested containers 130 is available, as shown schematically in FIG. 11.

The grouping mechanism can further include one or more sensors 68 for sensing operating conditions of the stacking system 100 and outputting a sensor signal to the controller 66 corresponding to the sensed condition. In one example, the controller 66 receives a sensor signal indicating the rotation of the orienting screw set 30, e.g., the number of full rotations and/or the speed of rotation of the orienting screws set 30, from which the controller 66 can determine the number of containers 130 outputted in the nested series 60 to the discharge chute 72, and the rate at which the containers 130 are progressing into the discharge chute 72. The stacking system 100 can further include a discharge sensor 68 which can be configured as a photo eye or other visual sensor, for monitoring the discharge end 48 of the orienting screw set 30, such that, for example, if an empty nesting pocket 62, an improperly nested container 130 (such as a partially nested container) or other condition affecting the number of containers 130 outputted in the nested series 60 is detected, the controller 66 can utilize the sensor signal from the discharge sensor 68 to adjust the actuation cycle of the first and second linear actuators 82, 86, for example, to assure that each stacked group 80 pulled from the nested series 60 includes the correct predetermined number of containers 130.

Figure 11A:
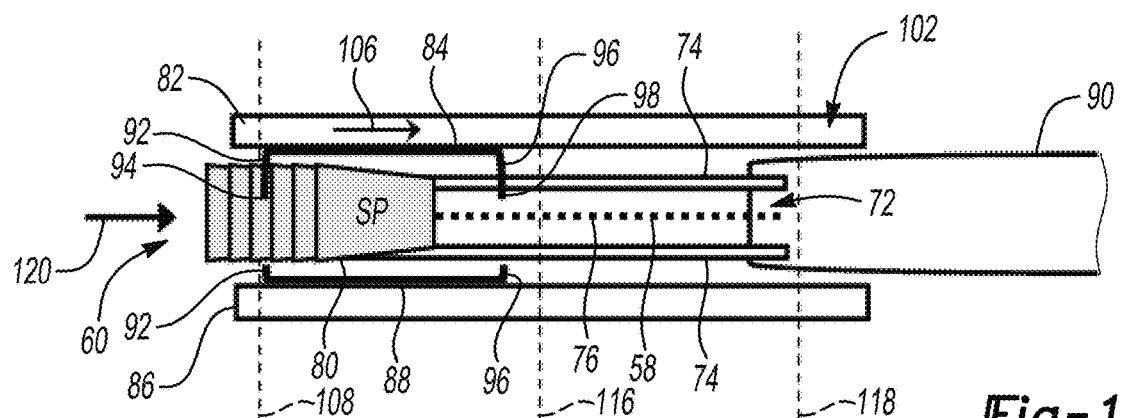
FIG. 11A is a schematic illustration of a top view of the grouping mechanism of FIG. 1 showing a stacked group in a first position.
Figure 11B:
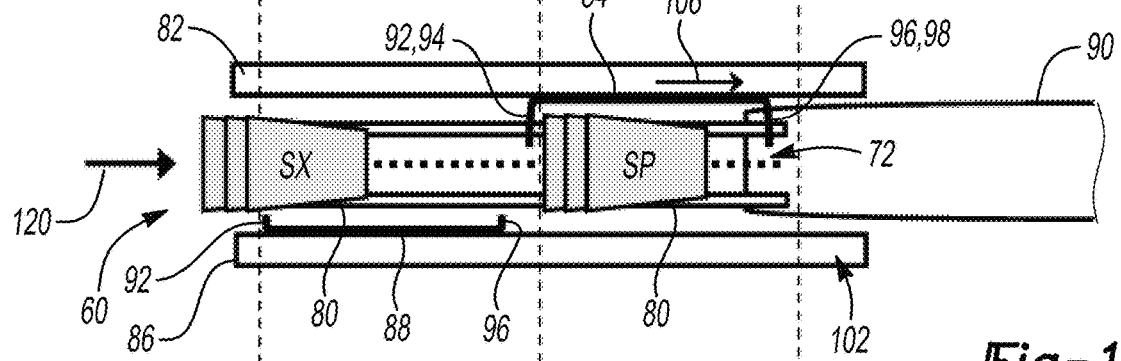
FIG. 11B is a schematic illustration of a top view of the grouping mechanism of FIG. 1 showing pulling of the stacked group from a first to a second position by the grouping mechanism.

In the illustrative example, each of the linear actuators 82, 86 includes a respective slide rail 84, 88 which is movable axially along the length of the discharge chute 72 by the linear actuator 82, 86. In the example shown, a puller 92 is operatively attached to one end of the slide rail 84, 88, and a pusher 96 is operatively attached to the other end of the slide rail 84, 88. The puller 92 can include a puller finger 94 which is actuable by the controller 66 and/or via the linear actuator 82, 86 to engage a selected container 130 in the nested series when the controller determines that a stacked group 80 including the selected container corresponds to the predetermined number of containers 130 required for forming the stacked group 80. As shown in FIG. 11, during axial movement of the slide rail 84 in a slide direction 106, from a first position 108 with the actuated puller finger 94 engaged with the selected container 130, the slide rail 84 via the puller 92 exerts a pull force on the selected container 130 causing a stacked group 80 (SP in FIG. 11A) consisting of the predetermined number of containers 130 including the selected container 130 to be separated from the nested series 60 and moved to a second position 116 in the discharge chute 72, as shown in FIG. 11B.

Figure 11C:
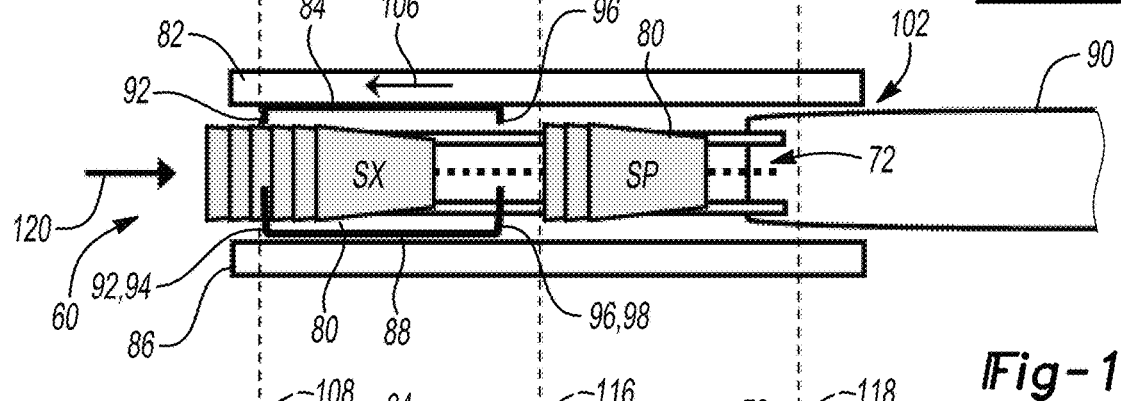
FIG. 11C is a schematic illustration of a top view of the grouping mechanism of FIG. 1 showing another stacked group in the first position and the preceding stacked group in the second position.

As shown in FIG. 11C, the slide rail 84 then moves axially in slide direction 106 to return to the first position 108. The puller finger 94 is deactuated during return of the slide to the first position, such that the puller finger 94 does not contact and/or has only incidental contact with the nested series 60 of containers 130 accumulating in the discharge chute 72 from the orienting screw set 30. In one example, the puller finger 94 may be spring loaded and/or otherwise biased to retract to the puller 92 when deactuated and/or during movement of the slide rail 84 from the second position 116 to the first position 108. In a non-limiting example, the pusher 96 located at the opposing end of the slide rail 84 can include a pusher arm 98 pivotally connected to the pusher, such that the pusher arm 98 is pivotable from a passive position proximate the slide rail to a pushing position during movement of the slide rail 84 from the first position 108 to the second position 116.

Referring again to FIG. 11C, when the predetermined number of containers 130 are accumulated in the discharge chute 72, the controller 66 actuates the puller finger 94 of the second linear actuator 86 and slide rail 88, to being the action of pulling another stacked group 80 (SX) of containers 130 from the nested series 60. As the slide rail 88 moves axially from the first position 108 to the second position 116, the puller 94 pulls the stacked group 80 (SX) from the first position 108 and progresses the pulled stacked group 80 (SX) to the second position 116, while contemporaneously, the pusher 96 and/or pusher arm 98 engages the preceding stacked group 80 (SP) located at the second position 116, and exerts a pushing force on the stacked group 80 (SP) to axially progress the stacked group 80 (SP) from the second position 116 to a third position 118, where at the third position 118, the stacked group 80 (SP) is discharged from the outfeed end 102 of the grouping mechanism 70, as indicated at 240 of the stacking method 200 shown in FIG. 2. As the slide rail 88 returns from the second position 116 to the first position 108, the pusher arm 98 is pivoted to a non-pushing position, for example, by incidental contact with the stacked group 80 (SX) located at the second position 116 in the discharge chute 72.

Figure 11D:
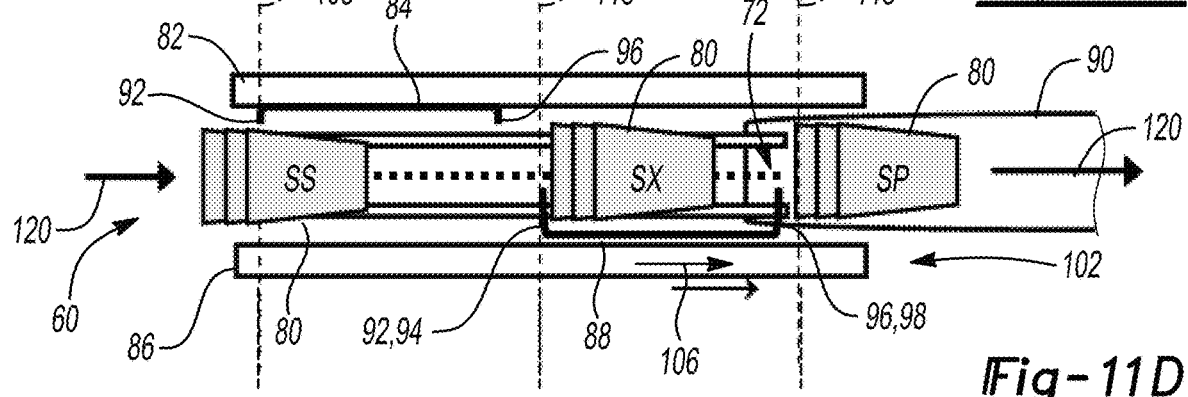
FIG. 11D is a schematic illustration of a top view of the grouping mechanism of FIG. 1 showing pulling of the stacked group from the first position to the second position and pushing of the preceding group from the grouping mechanism to an outfeed conveyor.

At step 245 of the stacking method 200, and as shown in FIG. 11D, the stacked group 80 (SP) in a non-limiting example, is fed out from the discharge chute 72 to an outfeed conveyor 90, for conveyance to a subsequent operation, such as a sleeving or other operation. In one example, the conveyor speed of the outfeed conveyor 90 can be varied to vary the interval distance between the stacked groups 80 discharged to the outfeed conveyor 90. In one example, the conveyor speed of the outfeed conveyor 90 is synchronized via the controller 66 with at least one of the rotation of the orienting screw set 30, the cycling of the linear actuators 82, 86, coordination of the output rate of the stacked groups 80 from the stacking system 100 with stacked groups 80 output from other stacking systems 100, and/or the condition and/or demand requirements of a subsequent or downstream operation for the stacked groups 80.

The example illustrated by the figures is non-limiting, and it would be understood that other configurations of the stacking system 100 are anticipated within the scope of this disclosure. For example, the stacking system 100 can be configured such that the containers 130 presented to the infeed screw set 20 can be positioned on the infeed conveyor 10 in an upright vertical orientation and processed as described herein through the stacking system 100 to form horizontal stacked groups 80 therefrom. Accordingly, the term "vertical orientation" includes both inverted vertical orientation and upright vertical orientation within the scope of the invention described herein. In a preferred example, the containers 130 are positioned in the inverted vertical orientation for greater stability during movement on the infeed conveyor 10, as compared with like containers positioned in the upright vertical orientation on the infeed conveyor. Likewise, it would be understood that the stacking system 100 can be configured to translate the containers 130 from a vertical orientation to a horizontal orientation such that, with the container 130 positioned in the horizontal orientation, the open end 152 of the container precedes the closed end 146 of the container as the container 130 is progressed axially in the direction of travel 120. In this example, the containers 130 nest to each other in the nesting portion 126 of the orienting screw set 30 by a respective container CX receiving the closed end 146 of the preceding container CP into the opening 140 of the respective container CX, and by the succeeding container CS receiving the closed end 146 of the respective container CX into the opening 140 of the succeeding container CS to form the nested series 60 of containers 130. In a preferred example, the containers 130 are positioned as shown in the figures, with the closed end 146 preceding the open end 152 in the direction of travel 120, such that any axial misalignment of a respective container CX with the preceding container CP during the nesting process is accommodated by contact between the base edge 144 of the preceding container CP with the inner surface of the respective container CX to induce axial alignment between the nesting containers CP, CX. Further, it would be understood that the stacking system 100 can be configured to receive and form stacked groups 80 from containers 130 which have shapes other than the shape of the example container 130 shown the figures, including, for example, containers having a shape configured such that one container in a horizontal orientation can be nested to another like container in the horizontal orientation including, for example, conical-shaped or partially conical or frustoconical shaped containers. In these non-limiting examples, it would be understood that the shapes of the various infeed, orienting and nesting pockets may require modification to accommodate changes to one or more of the shape of the container 130 (non-frustoconical), the vertical orientation (upright or invented), the horizontal orientation for nesting (opening forward or base forward).

As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially). If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire disclosed range. Each value within a range and the endpoints of a range are all disclosed as separate embodiments. The terms "comprising," "includes," "including," "has," and "having" are inclusive and therefore specify the presence of stated items, but do not preclude the presence of other items. As used in this disclosure, the term "or" includes any and all combinations of one or more of the listed items.

The above features and other features and advantages of the present invention are readily apparent from the detailed description of the best modes for carrying out the invention described herein, when taken in connection with the accompanying drawings. While some of the best modes and other embodiments for carrying out the claimed invention have been described in detail, various alternative designs and embodiments exist for practicing the invention.

The invention claimed is:

1. A method for stacking a plurality of containers into a stacked group, the method comprising:
   positioning a series of containers in a vertical orientation on an infeed conveyor;
   each respective container of the series of containers including a proximal end and a distal end;
   receiving each respective container into a receiving pocket of an orienting screw set defining an orienting channel axis;
   wherein the orienting screw set includes an upper orienting screw disposed above a lower orienting screw to define the receiving pocket and a series of orienting pockets distributed axially along the orienting channel axis;
   cradling the respective container in the vertical orientation within the receiving pocket such that the proximal end is in contact with the upper orienting screw and the distal end is in contact with the lower orienting screw;
   progressing the respective container axially from the receiving pocket through the series of orienting pockets;
   translating the respective container from the vertical orientation to a substantially horizontal orientation as the respective container is progressed axially through the series of orienting pockets.

2. The method of claim 1, further comprising:
   cradling the respective container between the upper orienting screw and the lower orienting screw, in each of the orienting pockets, as the respective container is progressed axially through the series of orienting pockets.

3. The method of claim 1, wherein each orienting pocket defines a tilt angle;
   wherein the tilt angle of each respective orienting pocket is different from the tilt angle of each of the other orienting pockets; and
   wherein translation of the respective container from the vertical orientation to the substantially horizontal orientation further comprises:
   tilting the respective container to the tilt angle defined by the respective orienting pocket.

4. The method of claim 1, wherein the series of containers includes the respective container, a preceding container, and a succeeding container which are received by the receiving pocket such that, as the preceding container, the respective container and the succeeding container progress axially through the orienting screw set, the preceding container precedes the respective container, and the succeeding containing succeeds the respective container;
   wherein the orienting screw set further includes a series of nesting pockets;
   wherein the series of orienting pockets is intermediate the receiving pocket and the series of nesting pockets;
   the method further comprising:
   progressing the respective container in the substantially horizontal orientation axially through the series of nesting pockets;
   nesting the proximal end of the respective container to the distal end of the preceding container as the respective container is progressed axially through the series of nesting pockets; and
   nesting the proximal end of a succeeding container is nested to the distal end of the respective container as the respective container is progressed axially through the series of nesting pockets.

5. The method of claim 4, wherein each nesting pocket defines a nesting offset;
   wherein the nesting offset of each respective nesting pocket is different from the nesting offset of each of the other nesting pockets;
   the method further comprising:
   decreasing a nesting offset distance between the respective container and the preceding container to a stack offset distance as the containers progress axially through the nesting pockets to a discharge end of the orienting screw set, to form a nested series of containers.

6. The method of claim 5, wherein each container of the nested series is offset from an adjacent container of the nested series by the stack offset distance.

7. The method of claim 5, further comprising:
   discharging the nested series of containers from the discharge end to a discharge chute;
   separating, via a grouping mechanism and in the discharge chute, a predetermined number of the nested containers from the nested series to form a stacked group; and
   discharging the stacked group from an outfeed end of the discharge chute.

8. The method of claim 1, further comprising:
   progressing the series of containers in the vertical orientation along the infeed conveyor via an infeed screw set;
   wherein the infeed screw set includes an output pocket;

wherein the output pocket and the receiving pocket define a transition pocket therebetween;

discharging each respective container from the infeed screw set and off the infeed conveyor into the transition pocket.

9. A system for stacking a plurality of containers into a stacked group, comprising:
an orienting screw set including an upper orienting screw disposed above a lower orienting screw;
an orienting channel axis defined by the orienting screw set;
the upper orienting screw and the lower orienting screw defining a receiving pocket and a series of orienting pockets distributed axially along the orienting channel axis;
the receiving pocket configured to receive a container in a vertical orientation from an infeed conveyor;
the series of orienting pockets configured to translate the container from the vertical orientation to a substantially horizontal orientation as the container is progressed axially through the series of orienting pockets via rotation of the orienting screw set;
a tilt angle defined by each orienting pocket of the series of orienting pockets;
wherein the tilt angle of each respective orienting pocket is different from the tilt angle of each of the other orienting pockets; and
wherein each respective orienting pocket is configured to translate the container to the tilt angle defined by the respective orienting pocket via rotation of the orienting screw set.

10. The system of claim 9,
an orienting portion and a nesting portion defined by the orienting screw set;
wherein the orienting and nesting portions are integral to the orienting screw set and continuous with each other;
the orienting portion including the series of orienting pockets;
the nesting portion including a series of nesting pockets;
wherein the series of nesting pockets are configured to receive the container from the orienting portion and to progress the container in substantially horizontal orientation axially through the series of nesting pockets via rotation of the orienting screw set.

11. The system of claim 10, wherein the container is a respective container of a series of containers received by the receiving pocket, series of containers further including a preceding container preceding the respective container in the series of containers, and a succeeding container succeeding the respective container in the series of containers; and
wherein the series of nesting pockets is configured to nest the respective container to the preceding container, and to nest the succeeding container to the respective container, to form a nested series of containers.

12. The system of claim 11, further comprising:
a nesting offset defined by each nesting pocket;
wherein the nesting offset of each respective nesting pocket is different from the nesting offset of each of the other nesting pockets;
the series of nesting pockets configured to decrease a nesting offset distance between the respective container and the preceding container to a stack offset distance as the containers progress axially through the nesting pockets to a discharge end of the orienting screw set, to form a nested series of containers; and wherein each container of the nested series is offset from an adjacent container of the nested series by the stack offset distance.

13. The system of claim 12, further comprising:
a grouping mechanism including a discharge chute configured to receive the nested series of containers from the discharge end of the orienting screw set;
wherein the grouping mechanism includes:
a linear actuator including a slide rail arranged such that the slide rail is movable axially relative to the discharge chute;
a puller operatively attached to the slide rail and actuable via the linear actuator to engage a selected container from the nested series; and
wherein the slide rail is actuable to move axially relative to the discharge chute from a first position to a second position;
wherein, in the first position, the puller engages the selected container; and
wherein, axial movement of the slide rail from the first position to the second position:
separates a stacked group of nested containers including the selected container from the nested series; and
pulls the stacked group from the first position to the second position in the discharge chute.

14. The system of claim 13, further comprising:
a controller in communication with the linear actuator and configured to actuate the puller;
wherein the controller is configured to generate a count signal corresponding to a number of containers discharged from the orienting screw set;
wherein the controller is configured to actuate the puller to engage the selected container when the count signal corresponds to a predetermined number of containers;
wherein the predetermined number defines the number of containers in the stacked group.

15. The system of claim 13, wherein the stacked group in the second position is a preceding stacked group;
wherein the slide rail is movable axially to return to the first position from the second position and is actuable in the first position to separate a respective stacked group from the nested series;
the system further comprising:
a pusher operatively attached to the slide rail and operable to push the preceding stacked group from the second position to a third position by axial movement of the slide rail from the first position to the second position;
wherein in the third position the preceding stacked group is discharged from an outfeed end of the discharge chute.

16. The system of claim 9, further comprising:
a first thread form defined by the upper orienting screw;
a second thread form defined by the lower orienting screw;
wherein the first thread form is different from the second thread form such that each of the orienting pockets defined by the orienting screw set is asymmetrical relative to the orienting channel axis.

17. The system of claim 9, further comprising:
an infeed screw set configured to progress a series of containers in the vertical orientation along the infeed conveyor;
wherein the infeed screw set includes an output pocket adjacent the receiving pocket;
wherein the output pocket and the receiving pocket define a transition pocket therebetween; and the infeed screw set configured to discharge the container from the infeed screw set and off the infeed conveyor into the transition pocket.

18. The system of claim 17, further comprising:
a first infeed screw axis defined by the first infeed screw;
a second infeed screw axis defined by the second infeed screw;
an infeed channel axis defined by the infeed channel;
a first plane including the first infeed screw axis, the second infeed screw axis and the infeed channel axis;
an upper orienting screw axis defined by the upper orienting screw;
a lower orienting screw axis defined by the lower orienting screw;
a second plane including the upper orienting screw axis, the lower orienting screw axis, the orienting channel axis and the infeed channel axis; and
wherein the infeed screw set and the orienting screw set are arranged such that the first plane is perpendicular to the second plane.

19. An orienting screw set comprising:
a first orienting screw;
a first thread form defined by the upper orienting screw;
a second orienting screw;
a second thread form defined by the lower orienting screw;
an orienting channel defined by the first orienting screw and the second orienting screw;
a orienting channel axis defined by the orienting channel;
a first end defining a receiving pocket configured to receive a container;
wherein the container defines a container axis;
the receiving pocket configured to receive the container in a vertical orientation such that the container axis in the vertical orientation is substantially perpendicular to the orienting channel axis;
a second end configured to discharge the container in a substantially horizontal orientation such that the container axis in the horizontal orientation is substantially parallel to the orienting channel axis;
a series of orienting pockets configured for translating the container from the vertical orientation to the horizontal orientation by rotation of the first and second orienting screws; and
wherein the first thread form is different from the second thread form such that each of the orienting pockets defined by the orienting screw set is asymmetrical relative to the orienting channel axis.

* * * * *